United States Patent
Batzinger et al.

(10) Patent No.: US 12,306,108 B2
(45) Date of Patent: May 20, 2025

(54) SYSTEMS AND METHODS OF LOCATING COOLING FEATURES IN A GAS TURBINE COMPONENT UNDER THERMAL BARRIER COATINGS

(71) Applicant: GENERAL ELECTRIC COMPANY, Schenectady, NY (US)

(72) Inventors: Thomas J. Batzinger, Schenectady, NY (US); Thomas E. Moldenhauer, Schenectady, NY (US); Keith C. Belsom, Laurens, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 223 days.

(21) Appl. No.: 18/303,965

(22) Filed: Apr. 20, 2023

(65) Prior Publication Data
US 2024/0353343 A1    Oct. 24, 2024

(51) Int. Cl.
*G01N 21/84* (2006.01)
*F01D 5/28* (2006.01)

(52) U.S. Cl.
CPC ......... *G01N 21/8422* (2013.01); *F01D 5/288* (2013.01); *F05D 2230/10* (2013.01); *F05D 2230/90* (2013.01); *G01N 2021/8433* (2013.01)

(58) Field of Classification Search
CPC .............. G01N 21/27; G01N 21/9515; G01N 2223/304; G01N 2223/305; G01N 23/046; G01N 27/82; G01N 27/83; G01N 15/0227; G01N 15/1429; G01N 15/1434; G01N 2015/0046; G01N 2015/144; G01N 2015/1493; G01N 2015/1497; G01N 21/84; G01N 21/8806; G01N 21/95692; G01N 33/225; G01N 19/08; G01N 27/20; G01N 29/069

See application file for complete search history.

(56) References Cited

U.S. PATENT DOCUMENTS

| 5,054,087 | A |   | 10/1991 | Carbon et al. |
| 5,216,808 | A | * | 6/1993  | Martus ............... B23P 6/002 29/889.71 |
| 6,524,395 | B1 | * | 2/2003 | Devine, II ............ C23C 4/00 134/22.12 |

(Continued)

FOREIGN PATENT DOCUMENTS

| DE | 102004030501 A1 * | 1/2006 | ............. G01N 27/85 |
| EP | 2 386 824 A1 | 11/2011 | |

(Continued)

OTHER PUBLICATIONS

Extended European Search Report, EP24166152.9, dated Nov. 15, 2024 (8 pp.).

*Primary Examiner* — Michael P Stafira
(74) *Attorney, Agent, or Firm* — Eversheds Sutherland (US) LLP (57) ABSTRACT

The present application provides a cooling hole location system for locating a cooling hole in a gas turbine component, wherein the cooling hole is covered by a thermal barrier coating. The cooling hole location system may include a light source positioned on a first side of the gas turbine component and an optical detector positioned on a second side of the gas turbine component. The optical detector detects light from the light source visible through the thermal barrier coating covering the cooling hole.

17 Claims, 5 Drawing Sheets

(56) References Cited

U.S. PATENT DOCUMENTS

| | | |
|---|---|---|
| 6,723,951 B1 | 4/2004 | McGraw |
| 9,702,817 B2 | 7/2017 | Worth et al. |
| 10,471,552 B2 | 11/2019 | Raulerson et al. |
| 2006/0147300 A1 | 7/2006 | Toppen et al. |
| 2016/0153865 A1* | 6/2016 | Lana .................... G01M 15/14 73/112.01 |
| 2016/0195474 A1 | 7/2016 | Worth et al. |
| 2017/0138723 A1 | 5/2017 | Hovis et al. |
| 2017/0350683 A1* | 12/2017 | Bather ...................... F01D 9/02 |
| 2018/0005368 A1 | 1/2018 | Nalladega et al. |
| 2020/0016702 A1* | 1/2020 | Raulerson ................. G06T 7/73 |
| 2021/0383030 A1 | 12/2021 | Ramamurthy et al. |

FOREIGN PATENT DOCUMENTS

| | | | | |
|---|---|---|---|---|
| EP | 3647534 A1 * | 5/2020 | ........... | F01D 21/003 |
| WO | WO-2012035060 A1 * | 3/2012 | .............. | B23P 15/04 |

* cited by examiner

SYSTEMS AND METHODS OF LOCATING COOLING FEATURES IN A GAS TURBINE COMPONENT UNDER THERMAL BARRIER COATINGS

TECHNICAL FIELD

The present application and the resultant patent relate generally to gas turbine engines and more particularly relate to systems and methods of locating cooling features in a gas turbine component under thermal barrier coatings using a light source and an optical detector.

BACKGROUND

A gas turbine engine conventionally includes a compressor for compressing ambient air and a combustor for mixing the flow of air with a flow of fuel to generate hot combustion gases. A turbine receives the flow of hot combustion gases and extracts energy therefrom for powering the compressor and for producing output power for an external load such as an electrical generator and the like. As the combustor and turbine temperatures have increased to improve the overall efficiency of the gas turbine engine, a cooling fluid, such as air, may be required to maintain the temperatures of the combustion components, the hot gas path components, and other types of components at levels that can be withstood by the materials thereof. Cooling air therefore may be directed through the components and out via cooling features such as cooling holes on the surface thereof. The number, shape, size, and location of the cooling holes thus may be important parameters for efficient cooling of the components.

There is thus an ongoing demand for these turbine components to be capable of withstanding increasingly higher temperatures without deterioration, failure, or a decrease in the overall useful lifetime. One method of increasing temperature resistance is the application of thermal barrier coatings to the surface of the components. Such thermal barrier coatings may include thin ceramic layers of low thermal conductivity, such as partially stabilized zirconia (PSZ). The coating imparts good adhesion of the ceramic to the substrate of the component. The application of the thermal barrier coating thus increases engine performance by enabling either increasing the gas turbine combustion temperature or reducing the required cooling-air flow.

Repairing the turbine components may include stripping and reapplying the thermal barrier coatings. The cooling holes, however, may be susceptible to closure from the application of the new coatings that are applied after the repairs have been made. A reduction in the number and/or diameter of the cooling holes would have a significant impact on overall component cooling and gas turbine performance.

SUMMARY

The present application and the resultant patent thus provide a cooling hole location system for locating a cooling hole in a gas turbine component, wherein the cooling hole is covered by a thermal barrier coating. The cooling hole location system may include a light source positioned on a first side of the gas turbine component and an optical detector positioned on a second side of the gas turbine component. The optical detector detects light from the light source visible through the thermal barrier coating covering the cooling hole.

The present application and the resultant patent further provide a method of locating a cooling hole in a gas turbine component covered with a thermal barrier coating. The method may include the steps of positioning a light source on a first side of the gas turbine component, positioning an optical detector on a second side of the gas turbine component, transmitting light from the light source at the first side of the gas turbine component, and maneuvering the light source and/or the optical detector until the light is detected through the thermal barrier coating by the optical detector.

The present application and the resultant patent further provide a cooling hole location system for locating a gas turbine component cooling hole covered by a thermal barrier coating. The cooling hole location system may include a gas turbine component, a light source positioned on a first side of the gas turbine component, an optical detector positioned on a second side of the gas turbine component, and a machining system. The optical detector detects light from the light source visible through the thermal barrier coating covering the cooling hole and then the machining system removes the thermal barrier coating covering the cooling hole.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
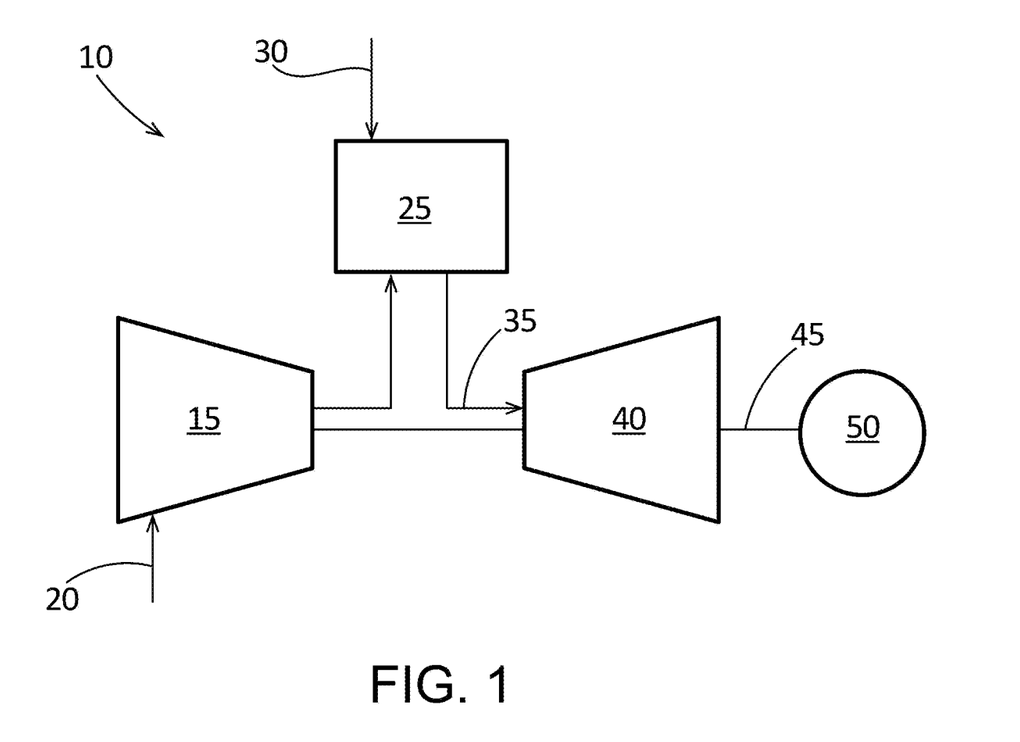
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
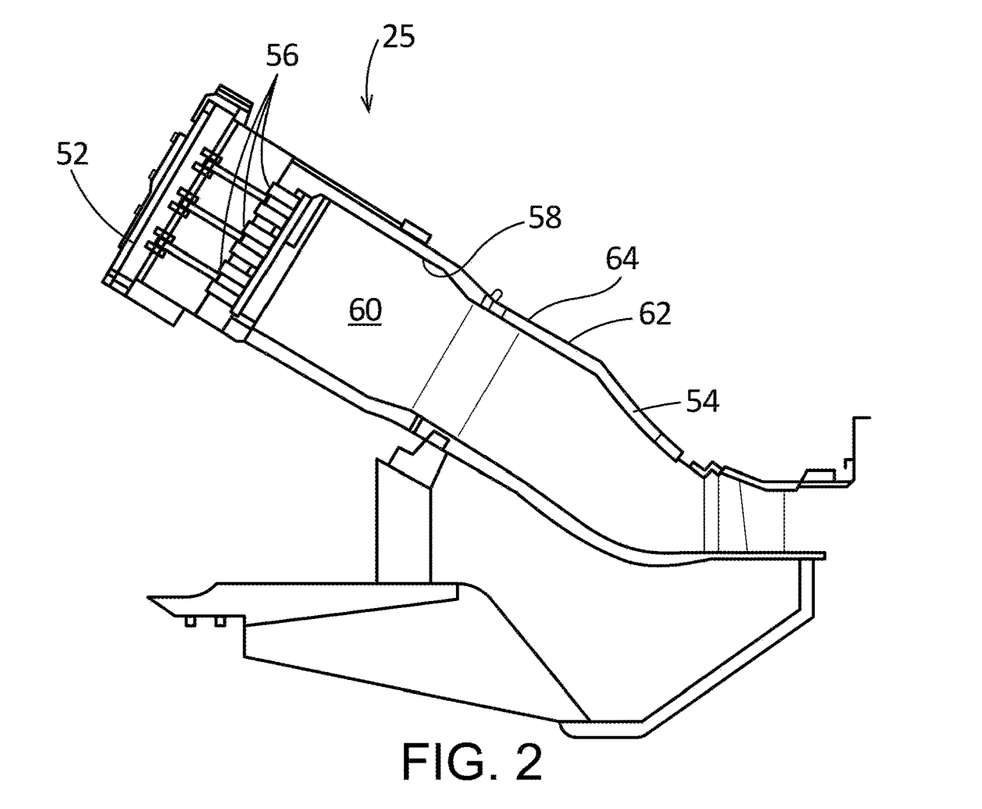
FIG. 2 is a schematic diagram of a combustor that may be used with the gas turbine engine of FIG. 1.

FIG. 2 shows a schematic diagram of an example of a known combustor 25 that may be used with the gas turbine engine 10 described above and elsewhere. The combustor 25 may extend from an end cap 52 at a head end to a transition piece 54 at an aft end about the turbine 40. A number of fuel nozzles 56 may be positioned about the end cap 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. The combustor 25 described herein is for the purpose of example only. Combustors with other components and other configurations may be used herein.

Figure 3:
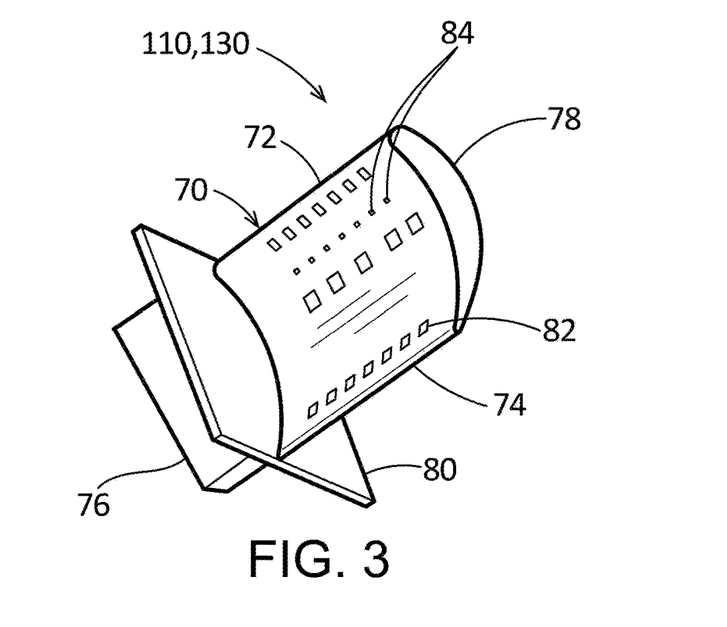
FIG. 3 is a perspective view of an airfoil that may be used with the turbine of the gas turbine engine of FIG. 1.

FIG. 3 shows an exemplary rotor blade or airfoil 70. The rotor blade or airfoil 70 may be used with the turbine 40 of the gas turbine engine 10. The airfoil 70 extends from an axially forward leading edge 72 to an axially aft trailing edge 74 and from a radially inward root 76 to a radially outer tip 78. The airfoil 70 includes a platform 80 defining a radially inner boundary of a hot gas path. The airfoil 70 also includes at least one substrate 82 with a number of cooling holes 84. The airfoil 70 described herein is for the purpose of example only. Airfoils 70 with other components and other configurations may be used herein.

Figure 4:
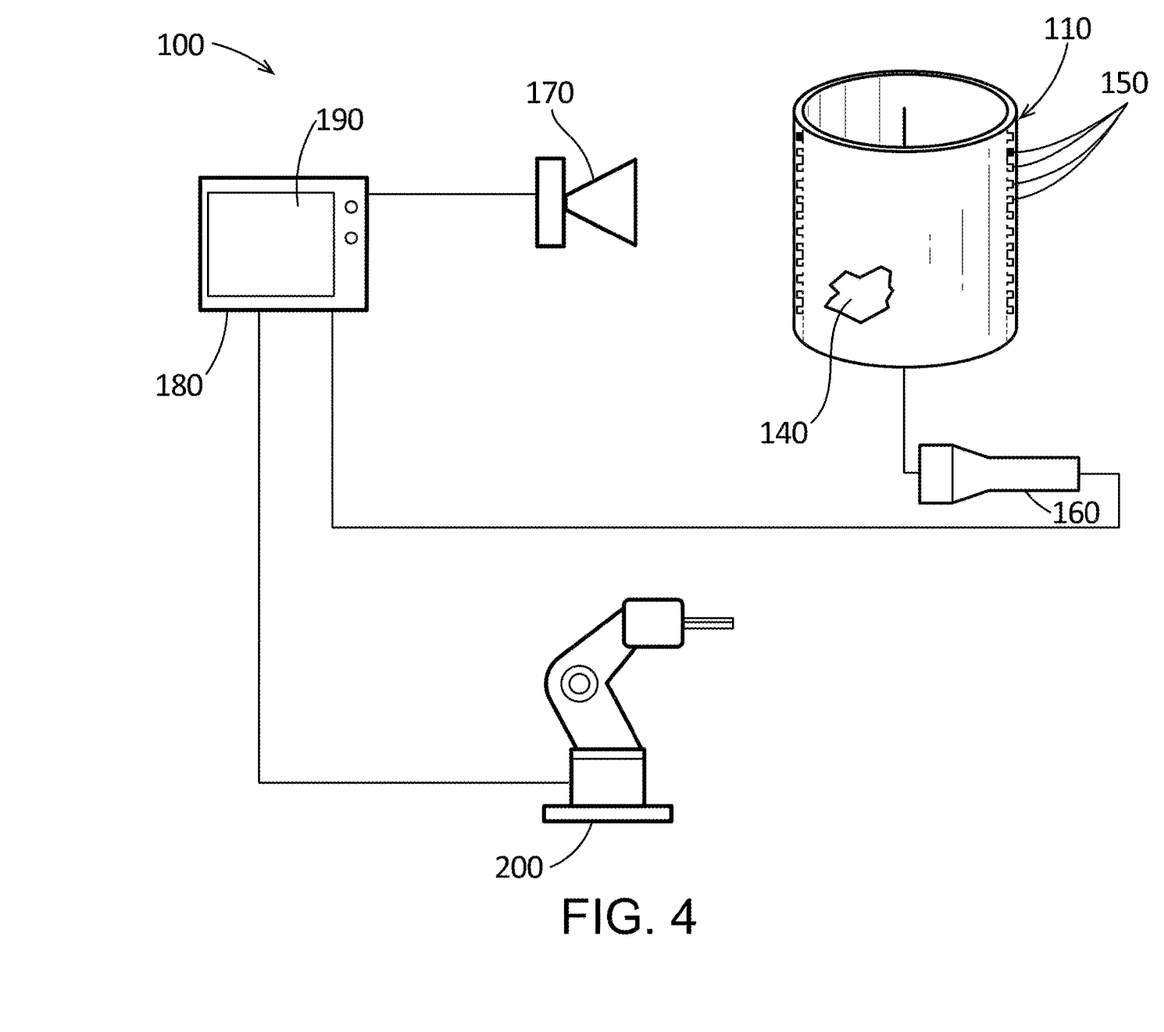
FIG. 4 is a schematic diagram of a cooling hole location system as may be described herein.
Figure 5:
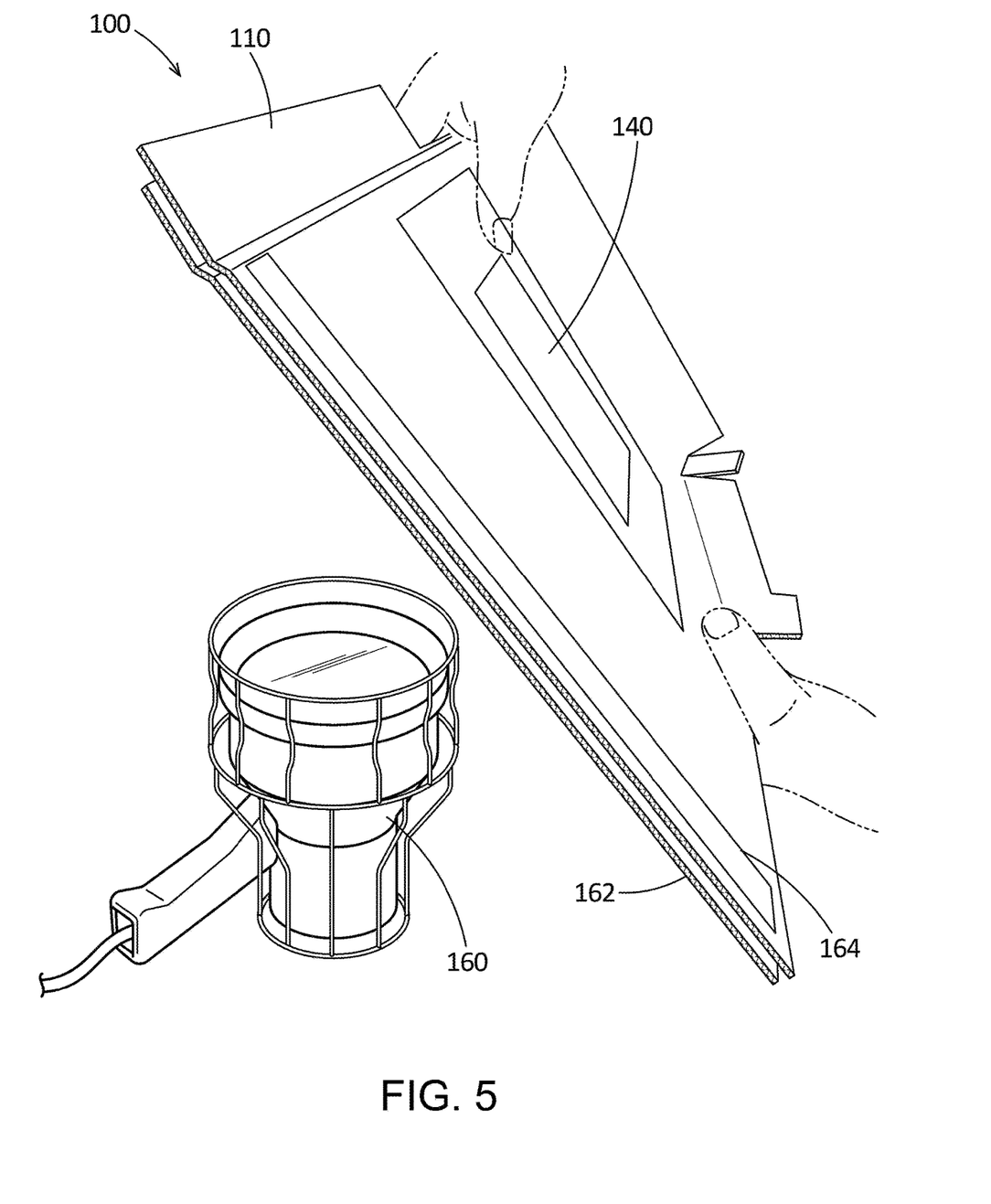
FIG. 5 is a further schematic diagram of portions of the cooling hole location system of FIG. 4.

FIGS. 4 and 5 show an example of a cooling hole location system 100 as may be described herein. As described above, during repair or refurbishment, a gas turbine component 110, such as a combustion component 120 and/or a hot gas path component 130, may be recoated with a thermal barrier coating 140. This recoating may cover the existing cooling holes 150 therein. These covered cooling holes 150 must be located and cleared before the gas turbine component 110 may be returned to service.

The material of the thermal barrier coating 140 may be somewhat translucent, i.e., the material may allow some light to pass therethrough if properly oriented. The cooling hole location system 100 thus may use a light source 160 in combination with an optical detector 170 to determine the location and orientation of the cooling holes 150 through the thermal barrier coating 140. The light source 160 may be a high intensity visible light, infrared light, and the like. Example may include a high intensity LED, a mercury or xenon arc, a metal halide lamp, and the like of any useful wavelength. The optical detector 170 may be a camera, a photodiode, and the like. Different type of filters also may be used to enhance contrast and the like. For example, a UV bandpass filter (100 to 400 nm) or subranges therein such as UVA (315 to 400 nm), UVB (280 to 315 nm), UVC (100 to 280 nm), and the like. The light source 160, the optical detector 170, and/or other components herein may be maneuverable or stationary.

The light source 160 and the optical detector 170 may be in communication with a controller 180. The controller 180 may be any type of programmable logic device, such as a microcomputer and the like, operated by control logic. More than one controller 180 may be used. The controller 180 may be dedicated to the cooling hole location system 100, part of the overall control of the gas turbine engine 10, part of a repair or manufacturing facility, or otherwise based. The controller 180 may be local or remote. One or more peripherals such as a monitor 190 and the like also may be used. Other components and other configurations may be used herein.

In use, the light source 160 may be placed on a first side 162 of the gas turbine component 110 and the optical detector 170 may be placed on a second side 164 of the gas turbine component 110. The first side 162 may be on the interior or the exterior of the gas turbine component 110 with the second side 164 being the reverse depending upon the nature of the gas turbine component 110. The light source 160 may be adjusted to provide the greatest intensity transmission through the cooling hole 150 and the thermal barrier coating 140. The greatest intensity may occur when the light source 160 and the optical detector 170 are aligned with the through axis of the cooling hole 150. The light source 160 and/or the optical detector 170 may be maneuvered until the light is detected through the thermal barrier coating 140 by the optical detector 170.

The position of the cooling holes 150 as determined by the optical detector 170 may be stored in the controller 180 or otherwise maintained for use in clearing the cooling holes 150. For example, the controller 180 may be in communication with a machining system 200 to clear the cooling holes 150. The machining system 200 may be any type of conventional machining device such as mechanical, electro-mechanical, laser, and the like capable of removing the thermal barrier coating 140 covering the cooling hole 150. Other components and other configurations may be used herein.

Figure 6:
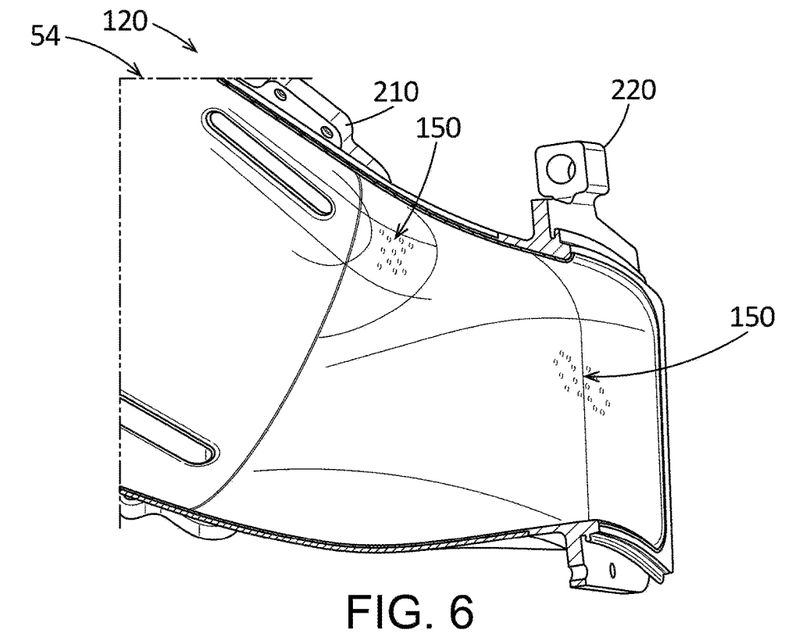
FIG. 6 is a partial sectional view of a gas turbine component with cooling holes therein.
Figure 7:
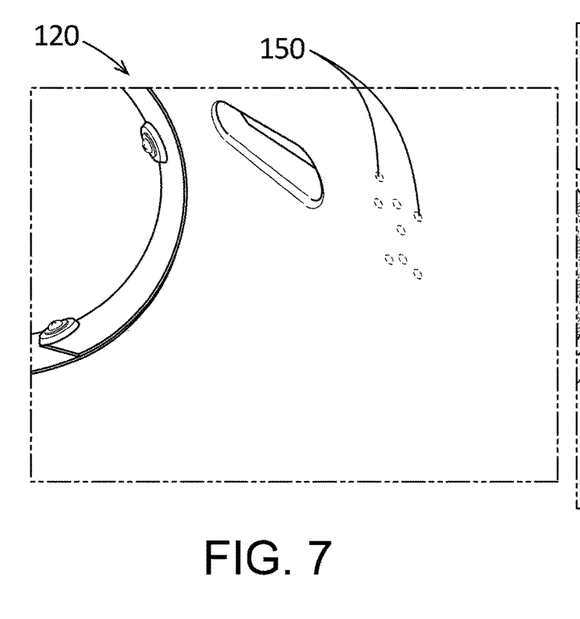
FIG. 7 is a partial perspective view of the gas turbine component of FIG. 6 with the cooling holes covered by a thermal barrier coating.
Figure 8:
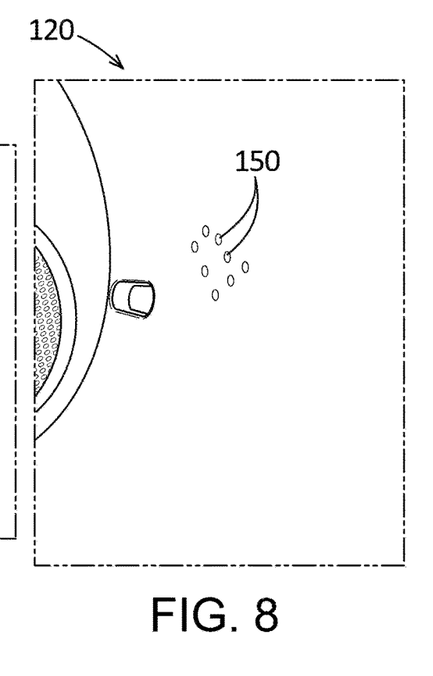
FIG. 8 is a partial perspective view of the gas turbine component of FIG. 6 with light visible through the thermal barrier coating in the cooling holes.

FIGS. 6-8 show an example of the use of the cooling hole location system 100. As described above, the combustor 25 has a transition piece 54 downstream of the fuel nozzles 56 and the combustion zone 60. The transition piece 54 thus is an example of a combustion component 120. As is seen in FIG. 6, the transition piece 54 may have a number of the cooling holes 150 formed therein between, for example, an axial fuel staging port 210 and an aft frame 220. At least the cooling holes 150 formed near the axial fuel staging port 210 may be drilled at an angle to accommodate the respective component geometry and respective flow paths. As is shown in FIG. 7, these cooling holes 150 may no longer be clearly visible once the interior of the transition piece 54 is recoated with the thermal barrier coating 140. As is shown in FIG. 8, light from the light source 160 may be visible through the thermal barrier coating 140 covering the cooling holes 150 within the transition piece 54. The cooling holes 150 then may be cleared via the machining system 200 or otherwise.

As similar process also may be used with a hot gas path component 130 such as the airfoil 70 of FIG. 3. In this example, the light source 160 may be positioned within the airfoil 70 such that light from the light source 160 may be externally visible through the thermal barrier coating 140 in the cooling holes 150. Again, the cooling holes 150 may be cleared of the thermal barrier coating 140 via the machining system 200 or otherwise once detected.

The cooling hole location system 100 thus provides a simplified system to locate the position of the cooling holes 150 when covered by the thermal barrier coating 140. The cooling hole location system 100 may be used with any type of gas turbine component 110 without the need to premeasure the cooling holes 150 before the reapplication of the thermal barrier coating 140. The cooling hole location system 100 thus relies on the high intensity light source 160 to determine the position of the cooling holes 150 under the thermal barrier coating 140 with appropriate accuracy to allow the machining system 200 to clear the cooling holes 150 without damage to the gas turbine component 110.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A cooling hole location system for locating a cooling hole in a gas turbine component, wherein the cooling hole is covered by a thermal barrier coating, comprising a light source positioned on a first side of the gas turbine component; and an optical detector positioned on a second side of the gas turbine component; wherein the optical detector detects light from the light source visible through the thermal barrier coating covering the cooling hole.
2. The cooling hole location system of any preceding clause, further comprising a controller in communication with the light source and the optical detector.
3. The cooling hole location system of any preceding clause, further comprising a display in communication with the controller.
4. The cooling hole location system of any preceding clause, further comprising a machining system to remove the thermal barrier coating covering the cooling hole.
5. The cooling hole location system of any preceding clause, wherein the gas turbine component comprises a combustion component.
6. The cooling hole location system of any preceding clause, wherein the gas turbine component comprises a hot gas path component.
7. The cooling hole location system of any preceding clause, wherein the hot gas path component comprises an airfoil.
8. The cooling hole location system of any preceding clause, wherein the first side comprising an interior of the gas turbine component.
9. The cooling hole location system of any preceding clause, wherein the first side comprises an exterior of the gas turbine component.
10. The cooling hole location system of any preceding clause, wherein the light source is maneuverable with respect to the gas turbine component.
11. The cooling hole location system of any preceding clause, wherein the light source is maneuverable about an axis of the cooling hole.
12. The cooling hole location system of any preceding clause, wherein the optical detector is maneuverable with respect to the gas turbine component.
13. The cooling hole location system of any preceding clause, wherein the light source comprises a visible light source.
14. The cooling hole location system of any preceding clause, wherein the light source comprises an infrared light source.
15. A method of locating a cooling hole in a gas turbine component covered with a thermal barrier coating, comprising positioning a light source on a first side of the gas turbine component; positioning an optical detector on a second side of the gas turbine component; transmitting light from the light source at the first side of the gas turbine component; and maneuvering the light source and/or the optical detector until the light is detected through the thermal barrier coating by the optical detector.
16. A cooling hole location system for locating a gas turbine component cooling hole covered by a thermal barrier coating, comprising: a gas turbine component; a light source positioned on a first side of the gas turbine component; an optical detector positioned on a second side of the gas turbine component; and a machining system; wherein the optical detector detects light from the light source visible through the thermal barrier coating covering the cooling hole; and wherein the machining system removes the thermal barrier coating covering the cooling hole.
17. The cooling hole location system of any preceding clause, further comprising a controller in communication with the light source, the optical detector, and the machining system.
18. The cooling hole location system of any preceding clause, wherein the gas turbine component comprises a combustion component or a hot gas path component.
19. The cooling hole location system of any preceding clause, wherein the first side comprising an interior or an exterior of the gas turbine component.
20. The cooling hole location system of any preceding clause, wherein the light source and/or the optical detector is maneuverable with respect to the gas turbine component.

We claim:

1. A cooling hole location system for locating a cooling hole in a gas turbine component, wherein the cooling hole is covered by a thermal barrier coating, comprising:
a light source positioned on a first side of the gas turbine component; and
an optical detector positioned on a second side of the gas turbine component;
wherein the light source and/or the optical detector is maneuverable with respect to the gas turbine component; and
wherein the optical detector detects light from the light source visible through the thermal barrier coating covering the cooling hole so as to determine location and orientation of the cooling hole.

2. The cooling hole location system of claim 1, further comprising a controller in communication with the light source and the optical detector.

3. The cooling hole location system of claim 2, further comprising a display in communication with the controller.

4. The cooling hole location system of claim 1, further comprising a machining system to remove the thermal barrier coating covering the cooling hole.

5. The cooling hole location system of claim 1, wherein the gas turbine component comprises a combustion component.

6. The cooling hole location system of claim 1, wherein the gas turbine component comprises a hot gas path component.

7. The cooling hole location system of claim 6, wherein the hot gas path component comprises an airfoil.

8. The cooling hole location system of claim 1, wherein the first side comprising an interior of the gas turbine component.

9. The cooling hole location system of claim 1, wherein the first side comprises an exterior of the gas turbine component.

10. The cooling hole location system of claim 1, wherein the light source is maneuverable about an axis of the cooling hole.

11. The cooling hole location system of claim 1, wherein the light source comprises a visible light source.

12. The cooling hole location system of claim 1, wherein the light source comprises an infrared light source.

13. A method of locating a cooling hole in a gas turbine component covered with a thermal barrier coating, comprising:
    positioning a light source on a first side of the gas turbine component;
    positioning an optical detector on a second side of the gas turbine component;
    transmitting light from the light source at the first side of the gas turbine component; and
    maneuvering the light source and/or the optical detector until the light is detected through the thermal barrier coating by the optical detector so as to determine location and orientation of the cooling hole.

14. A cooling hole location system for locating a gas turbine component cooling hole covered by a thermal barrier coating, comprising:
    a gas turbine component;
    a light source positioned on a first side of the gas turbine component;
    an optical detector positioned on a second side of the gas turbine component; and
    a machining system;
    wherein the light source and/or the optical detector is maneuverable with respect to the gas turbine component;
    wherein the optical detector detects light from the light source visible through the thermal barrier coating covering the cooling hole so as to determine location and orientation of the cooling hole; and
    wherein the machining system removes the thermal barrier coating covering the cooling hole.

15. The cooling hole location system of claim 14, further comprising a controller in communication with the light source, the optical detector, and the machining system.

16. The cooling hole location system of claim 14, wherein the gas turbine component comprises a combustion component or a hot gas path component.

17. The cooling hole location system of claim 14, wherein the first side comprising an interior or an exterior of the gas turbine component.

* * * * *